(12) United States Patent
Brun et al.

(10) Patent No.: US 11,470,673 B2
(45) Date of Patent: Oct. 11, 2022

(54) METHOD AND SYSTEM FOR DETECTING INTERRUPTION OF COMMUNICATIONS AND FOR AUTOMATICALLY RE-ESTABLISHING THE COMMUNICATIONS

(71) Applicant: ORANGE, Issy-les-Moulineaux (FR)

(72) Inventors: Arnaud Brun, Chatillon (FR); Patrick Kirschbaum, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/050,109

(22) PCT Filed: Apr. 9, 2019

(86) PCT No.: PCT/FR2019/050826
§ 371 (c)(1),
(2) Date: Oct. 23, 2020

(87) PCT Pub. No.: WO2019/207229
PCT Pub. Date: Oct. 31, 2019

(65) Prior Publication Data
US 2021/0168891 A1     Jun. 3, 2021

(30) Foreign Application Priority Data
Apr. 24, 2018 (FR) ...................................... 1853592

(51) Int. Cl.
*H04W 76/19*       (2018.01)
*H04W 76/18*       (2018.01)
*H04W 76/11*       (2018.01)

(52) U.S. Cl.
CPC ............ *H04W 76/19* (2018.02); *H04W 76/11* (2018.02); *H04W 76/18* (2018.02)

(58) Field of Classification Search
CPC ........ H04L 65/1083; H04M 2203/651; H04M 3/424; H04W 76/11; H04W 76/18; H04W 76/19
See application file for complete search history.

(56) References Cited

U.S. PATENT DOCUMENTS

2004/0235509 A1* 11/2004 Burritt .................... H04W 4/24
                                                                455/518
2005/0048981 A1*  3/2005 Anupam ............... H04W 76/19
                                                                455/445
(Continued)

OTHER PUBLICATIONS

International Search Report dated May 23, 2019 for corresponding International Application No. PCT/FR2019/050826, Apr. 9, 2019.
(Continued)

*Primary Examiner* — Kashif Siddiqui
(74) *Attorney, Agent, or Firm* — David D. Brush; Westman, Champlin & Koehler, P.A.

(57) ABSTRACT

A computerized method including: a) receiving, by a communication management platform, communication interruption information; b) receiving, by the platform, an identifier of terminals initially in communication; c) sending a communication request to the second terminal; d) in case of failure, repeating the sending; e) upon establishing communication between the platform and the second communication terminal (2), sending a request to communicate with the first communication terminal; f) upon establishing communication between the communication management platform and the first communication terminal, placing the two terminals in communication with each other.

20 Claims, 3 Drawing Sheets

(56) References Cited

U.S. PATENT DOCUMENTS

| | | | |
|---|---|---|---|
| 2005/0159138 A1* | 7/2005 | Florkey | H04L 12/66 455/414.1 |
| 2006/0203738 A1 | 9/2006 | Fok et al. | |
| 2008/0081627 A1* | 4/2008 | Shan | H04W 76/19 455/445 |
| 2011/0034159 A1* | 2/2011 | Philmon | H04M 3/42025 455/418 |
| 2011/0230196 A1* | 9/2011 | Tal | H04M 3/42374 455/450 |
| 2015/0237537 A1* | 8/2015 | Stimpson | H04W 36/0011 370/331 |
| 2016/0065733 A1 | 3/2016 | Huh et al. | |

OTHER PUBLICATIONS

Written Opinion of the International Searching Authority dated May 23, 2019 for corresponding International Application No. PCT/FR2019/050826, filed Apr. 9, 2019.

English translation of the Written Opinion of the International Searching Authority dated May 31, 2019 for corresponding International Application No. PCT/FR2019/050826, filed Apr. 9, 2019.

* cited by examiner

METHOD AND SYSTEM FOR DETECTING INTERRUPTION OF COMMUNICATIONS AND FOR AUTOMATICALLY RE-ESTABLISHING THE COMMUNICATIONS

CROSS-REFERENCE TO RELATED APPLICATIONS

This application is a Section 371 National Stage Application of International Application No. PCT/FR2019/050826, filed Apr. 9, 2019, which is incorporated by reference in its entirety and published as WO 2019/207229 A1 on Oct. 31, 2019, not in English.

FIELD OF THE DISCLOSURE

The invention falls within the field of communication management.

BACKGROUND

Automatic callback services exist on the fixed-line network. Such services make it possible to automatically contact at a later time a called party whose line is busy. This type of functionality is available in particular in certain private telephone exchanges, generally used in businesses, for example known by the abbreviation of PABX for "Private Automatic Branch Exchange".

Thus, when user A calls user B and B is already on a call, user A has the option of activating an automatic callback function (for example via a key on his terminal). When User B is once again reachable, the two users are called automatically in order to be placed in communication with one another.

However, such systems do not allow reestablishing an interrupted communication between two terminals. For example, if a communication is inadvertently interrupted, the users may not know the reason. Several situations may arise, none of them satisfactory for users:
  each of the two correspondents waits for the other to call back;
  the two correspondents try calling again at the same time. Each of their calls may then be forwarded to the called party's voicemail (forwarded to voicemail because of a busy line);
  a first of the users cannot be reached because disconnected from the network (loss of network, dead battery, etc.). The second user tries calling the first user again without success.

SUMMARY OF THE DISCLOSURE

The invention improves the situation.

A method is provided for warning of an interruption of a communication session, implemented by a warning device of a first communication terminal. The warning method comprises:
  sending, after an interruption of a first communication session between the first communication terminal and a second communication terminal, interruption information about the first communication session between the first communication terminal and the second terminal communication, to a communication management device, the sent interruption information about a communication session comprising a command to reestablish the first communication session between the first communication terminal and the second communication terminal.

Such a method makes certain user actions superfluous. In particular, users no longer need to reenter the number to be called or randomly repeat call attempts until the other person is once again reachable. In addition, advantageously, it is unnecessary for users to know the cause of the communication interruption. This method therefore makes it possible to simplify the use of communication means by mitigating accidental communication interruptions. In addition, the user is saved a significant amount of time.

According to another aspect, a communication terminal is provided, referred to as the first communication terminal, comprising a device for warning of an interruption of a communication session, capable of sending, after an interruption of a first communication session between the first communication terminal and a second communication terminal, interruption information about a communication session between the first communication terminal and a second communication terminal, to a communication management device, the sent interruption information about a communication session comprising a command to reestablish the first communication session between the first communication terminal and the second communication terminal.

According to another aspect of the invention, a communication management method implemented by a communication management device is provided. The communication management method comprises:
  after the communication management device receives interruption information about a communication session between a first communication terminal and a second communication terminal, the second communication terminal is sent a request to establish a second communication session, triggered by the received interruption information about a communication session, the received interruption information about a communication session comprising a command to reestablish the first communication session between the first communication terminal and the second communication terminal.

According to another aspect of the invention, a communication management device is provided comprising a requester capable of sending to the second communication terminal a request to establish a second communication session, triggered by interruption information about a first communication session between a first communication terminal and a second communication terminal, the interruption information having been received by the communication management device from the first communication terminal.

According to another aspect of the invention, a computer program is provided comprising instructions for implementing one of the methods as defined herein when this program is executed by a processor. According to another aspect of the invention, a non-transitory computer-readable storage medium is provided on which such a program is stored.

The following features may optionally be implemented. They may be implemented independently of one another or in combination with one another:
  The sent interruption information about a communication session comprises a first identifier associated with the first communication terminal and a second identifier associated with the second terminal. This makes it possible to transmit the identifiers of the two terminals participating in the interrupted communication session, with the communication session interruption information.

The warning method comprises a detection of an interruption of a first communication session between the first communication terminal and the second communication terminal. This allows a user to indicate that the communication was terminated due to an interruption. The user does not need to repeat his or her request because this is done automatically by the communication management device until communication is restored.

The communication management method comprises, in the event of failure to establish the second communication session between the communication management device and the second communication terminal, reiterating the step of sending to the second communication terminal a request to establish a second communication session. This automates the reiteration of requests.

The communication management method comprises, upon establishing the second communication session between the communication management device and the second communication terminal, sending a request to establish a third communication session with the first communication terminal, which triggers, upon establishing the third communication session between the communication management device and the first communication terminal, establishing a new first communication session between the first terminal and the second terminal by joining the second communication session and third communication session that have been established. This makes it possible to reestablish communication between the first terminal and the second terminal following the communication request.

The communication management method comprises, after establishing the third communication session between the communication management device and the first communication terminal, establishing a new first communication session between the first terminal and the second terminal by joining the second communication session and third communication session that have been established. This makes it possible to reestablish communication between the first terminal and the second terminal following the communication request.

In the communication management method, the reception by the communication management device of interruption information about a first communication session between the first communication terminal and the second communication terminal is achieved via a data exchange network. This makes it possible to predict the nature of exchanges containing the information.

In the communication management method, the first communication sessions between the first communication terminal and the second communication terminal are video communications.

BRIEF DESCRIPTION OF THE DRAWINGS

Other features, details, and advantages of the invention will be apparent from reading the following detailed description, and from analyzing the accompanying drawings in which.

For the most part, the drawings and the description below contain elements that are certain in nature. Therefore not only can they serve to provide a better understanding of the invention, but they also contribute to its definition, where appropriate.

DETAILED DESCRIPTION OF ILLUSTRATIVE EMBODIMENTS

In the following, the communication network between two terminals is referred to in general by the term "communication network", without distinguishing whether it is a fixed-line telephone communication network, a mobile telephone communication network, or a combination of several types of networks. A fixed-line telephone communication network and a mobile telephone communication network can thus be viewed as subsets, or parts, of the communication network.

Figure 1:
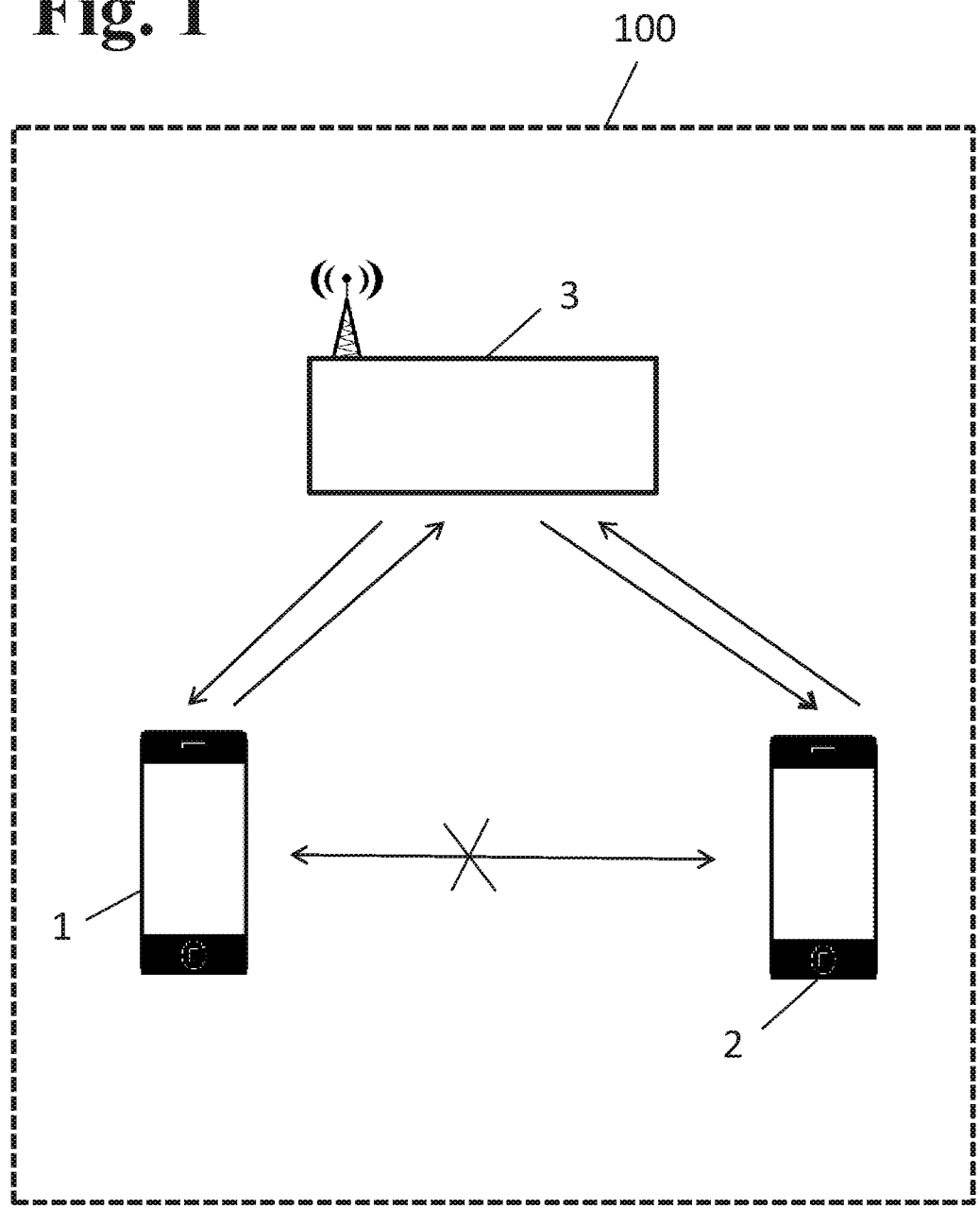
FIG. 1 illustrates a system comprising a first and a second communication terminal as well as a communication management platform according to the invention.

FIG. 1 illustrates a system 100. The system 100 comprises a first communication terminal 1 (or TC1), a second communication terminal 2 (or TC2), and a communication management device 3, in particular constituting or implemented in a communication management platform 3 (or PGC 3) as illustrated in FIG. 1. The first communication terminal 1 and the second communication terminal 2 are separate communication terminals.

Alternatively (not illustrated), the communication management device 3 may be implemented in the first communication terminal.

FIG. 1 shows the system 100 at time t. This time corresponds to the period between the end of step 1008 and the start of step 1009 of FIG. 2 described in detail below.

In the example shown here, at least one among the first communication terminal 1 and second communication terminal 2 is a mobile telephone. At least one among the first communication terminal 1 and second communication terminal 2 is, for example, a multifunctional telephone (better known by the term "smartphone"). At least one among the first communication terminal 1 and second communication terminal 2 houses a SIM card (acronym for "Subscriber Identity Module") associated with an IMSI subscriber identifier (acronym for "International Mobile Subscriber Identity"). An IMSI subscriber identifier allows identifying a communication terminal in the communication network to which the communication terminal is connected. The IMSI subscriber identifier is said to be "private" in the sense that it is used mainly by the managers of communication networks to identify and locate communication terminals in the communication network and to route communications correctly, without being generally known to users.

Alternatively, the first communication terminal 1 and/or the second communication terminal 2 are fixed-line telephones. Such a communication terminal may not have a SIM card and IMSI subscriber identifier.

There also exists a MSISDN call identifier (acronym for "Mobile Station International Subscriber Directory Number"). The MSISDN call identifier is generally assigned by a service provider to a communication terminal subscribing to the service, whether this concerns fixed-line or mobile telephony. It is said to be "public" in the sense that it is generally known to users and corresponds to what is commonly referred to as a "telephone number".

The service provider of a mobile telephone line maintains a correlation table between MSISDN call identifiers and IMSI subscriber identifiers. The service provider of a fixed telephone line maintains a correlation table between MSISDN call identifiers and a termination point of the fixed-line telephone network (geographically known). In normal operation, a communication session is initiated by the calling communication terminal, referred to as the first communication terminal, by providing its service provider with an MSISDN call identifier, referred to as the second identifier, of the user's communication terminal, referred to as the second communication terminal. Then, when the second MSISDN identifier corresponds to a mobile phone line, the caller's service provider identifies at least a second corresponding IMSI subscriber identifier to route the communication session to the called mobile communication terminal. This operation is generally transparent to users who are ignorant of their respective IMSI subscriber identifiers. When the second MSISDN call identifier corresponds to a fixed telephone line, the caller's service provider identifies the call termination point on the corresponding fixed-line network, i.e. the fixed-line second communication terminal, in order to route the communication session to said second communication terminal.

In the remainder of the description, the MSISDN call identifiers of the first communication terminal 1 and of the second communication terminal 2 are respectively denoted IA1 for the first identifier associated with the first communication terminal, and IA2 for the second identifier associated with the second communication terminal.

Alternatively, the first communication terminal 1 and/or the second communication terminal 2 are connected to the communication network by means of a private (or local) telephone communication network, for example by means of a PABX private telephone exchange (acronym for "Private Automatic Branch eXchange"). Also in such an embodiment, the first communication terminal 1 and/or the second communication terminal 2 respectively have a first call identifier IA1, and/or a second call identifier IA2.

The communication management device 3 is arranged to reestablish a first communication session between the first communication terminal 1 and the second communication terminal 2 after an interruption of the first communication session. For example, the communication management device PGC 3 is a mobile telephony communication platform. Alternatively, the communication management device PGC 3 is an interactive voice server, handling incoming calls with the aid of recorded voice messages or voice synthesis. The caller interacts with the server by voice or by preestablished sound frequencies generated through the keys of his or her phone.

A communication management method for a first telephone communication session between a first communication terminal 1 (for example TC1) and a second communication terminal 2 (for example TC2), in particular via a communication management device (for example a communication platform PGC3), will now be described with reference to FIG. 2.

Typically, the context of the implementation of the method is as follows: a first communication session is established between a first communication terminal 1 and a second communication terminal 2 at the request of one among the first communication terminal and the second communication terminal. The first communication session is ended although the user of the first communication terminal 1 and the user of the second communication terminal 2 wish to continue communicating: the first communication session is then said to be interrupted because it was not a ending voluntary but an involuntary one.

During a step 1001, the communication management device receives interruption information about the first communication session between the first communication terminal 1 and the second communication terminal 2. In cases where at least one among the first communication terminal 1 and second communication terminal 2 remains connected to a communication network, the interruption information about the first communication session may be sent from at least one among the first communication terminal 1 and second terminal communication 2. In the example described here, the second communication terminal 2 is considered as having been momentarily disconnected from the network. As a result, the interruption information about the first communication session is sent from the first communication terminal 1. Alternatively, the interruption information about the communication is sent by the communication network, or by a device of the communication network used by the first communication session. In particular, the interruption information about the communication session may be included in a message or a command sent to the communication management device.

The sending of such information upon interruption of the first communication session may be automated. "Automated" is understood here to mean that no action by the user is necessary to trigger the sending of the interruption information about the communication session. The sending of the information is triggered by a warning device, in particular of the first communication terminal. For example, the warning device makes use of a computer program previously installed in the warning device or the terminal implementing the warning device, often called an "application" in the case of smartphones. For example, interruption information about a communication session may be sent using the hypertext transfer protocol, better known by the abbreviation "HTTP".

The communication management device 3 receives a first identifier associated with the first communication terminal 1 and a second identifier associated with the second communication terminal 2, either in or with the communication session interruption information, during the first step 1001 or during a step 1002. In particular, the first identifier and second identifier are sent from at least one among the first communication terminal 1 and second communication terminal 2 (from the first communication terminal 1 in the example shown in the figures). For example, the sent first identifier and second identifier correspond to the subscriber and/or call identifiers (IMSI or MSISDN) IA1 and IA2. In other words, the communication management device PGC3 receives the telephone numbers of the first communication terminal 1 and second communication terminal 2.

The reception of communication session interruption information (step 1001) and the reception of the first and second identifiers (step 1002) may be implemented one after the other or may even be implemented simultaneously, by example by receiving a set of data including at least the two identifiers IA1 and IA2.

During a step 1003, the communication management device PGC3 sends a request to establish a second communication session REQ1 to the second communication terminal from which data relating to the communication session interruption (in particular communication session interruption information and/or first and second identifiers) were not received during the previous steps (1001 and/or 1002). In other words, in the example, the communication management device PGC3 has received data from the first communication terminal TC1 but not from the second communication terminal TC2. The communication management device PGC3 therefore sends the request to establish a second communication session REQ1 to the second communication terminal 2 by means of the second identifier IA2 previously received, in particular during step 1002. In the example described here, the communication management device PGC3 requests the establishment of a second communication session, in particular by sending an outgoing telephone call (specific embodiment of the first request to establish a second communication session REQ1) to the second communication terminal 2.

Optionally, in the case where the communication management device is an interactive voice server, the communication management device PGC3 establishes an application session with the first communication terminal and sends a prerecorded voice message to the first communication terminal. This voice message indicates for example to the user of the first communication terminal 1 the procedure to be followed to reestablish the first interrupted communication session with the second communication terminal 2. In this example, the voice message may indicate to the user to remain online and wait for automatic implementation of the rest of the method, in this case the establishment of the second communication session between the communication management device 3 and the second communication terminal 2.

In particular, the step 1003 requesting to establish the second communication session is delayed, meaning that the request REQ1 is not sent immediately after receiving the interruption information and/or first identifier and second identifier during step 1001 and/or step 1002. This receiving of the interruption information and/or first identifier and second identifier during step 1001 and/or step 1002 triggers a delay for a predefined period of time, at the end of which the request REQ1 to establish the second communication session is sent.

During a step 1004, the establishment or non-establishment of the second communication session between the second communication terminal TC2 and the communication management device PGC3 is verified. If the second communication terminal 2 has received the request REQ1 to establish a second communication session with the communication management device 3 and if the second communication terminal 2 is ready to establish the second communication session, the second communication session between the second communication terminal 2 and the communication management device 3 is established, in particular the opening of a communication channel between the second communication terminal 2 and the communication management device PGC3 is generated.

If the communication management device 3 is not implemented in the first communication terminal 1, for example if the communication management device 3 is implemented in a communication management platform PG3, the following step 1008 is implemented.

In the event that the second communication session is not established (for example in the event that the request REQ1 is not received and/or the second communication terminal 2 is unable to establish a communication session), a failure to establish the second communication session between the communication management device PGC3 and the second communication terminal 2 is noted. The noting of the failure to establish the second communication session triggers the reiteration of step 1003 requesting to establish a second communication session. Optionally, in the case where the communication management device is an interactive voice server, the communication management device PGC3 sends a prerecorded voice message to the second communication terminal 2. For example, the voice message asks the user of the second communication terminal to wait until the first communication session is reestablished between the second communication terminal and the first communication terminal.

The triggering of the reiteration in step 1004 may be delayed (in the event of failure to establish the second communication session between the communication management device PGC3 and the second communication terminal 2). For example, each iteration is spaced apart from the previous one and the next one by a preset period. Said period may be configurable. Typically, this period equals 30 seconds. Thus, repeating the request to establish the second communication session, implemented for example in the form of an attempt to call back the second communication terminal 2, is reiterated every 30 seconds until the second session is established. In addition, at least one maximum limit may be set, as a number of iterations and/or as time, before the communication management method is terminated in the event of repeated failures.

During step 1008, after the second communication session is established between the communication management device 3 and the second communication terminal 2, the communication management device PGC3 sends a request REQ2 to establish a third communication session to the first communication terminal from which data relating to the communication session interruption were received during the previous steps (1001 and/or 1002). For example, the request REQ2 to establish a third communication session may be implemented in the form of the communication management device PGC3 sending an outgoing telephone call to the first communication terminal 1.

Figure 2:
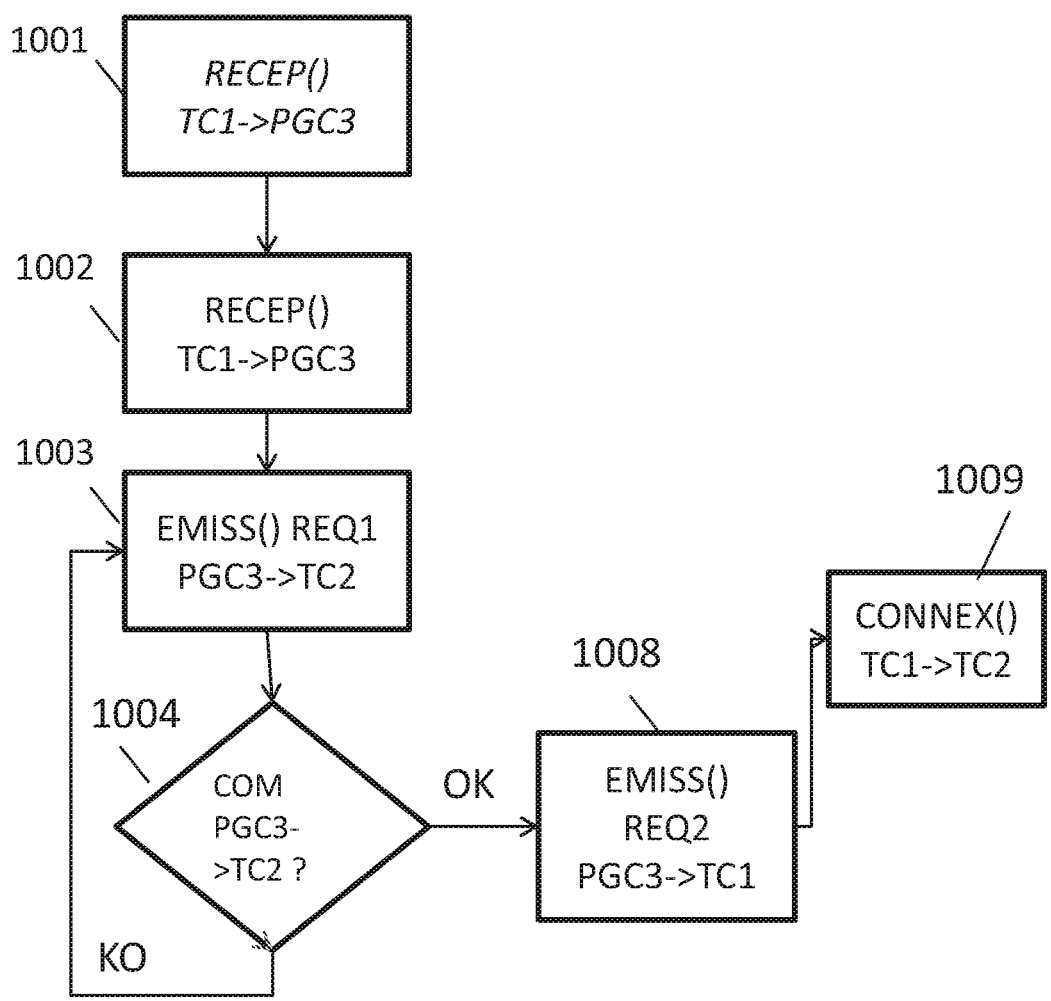
FIG. 2 illustrates a method for establishing a communication from a first communication terminal to a second communication terminal, implemented by a communication management platform according to the invention.

In the example illustrated by FIG. 2, if the third communication session between the communication device PGC3 and the first communication terminal 1 is not established, the communication device PGC3 does not reiterate the request to establish the third communication session REQ2 sent to the first communication terminal 1.

Alternatively (not illustrated), in the case where the third communication session is not established (for example in the event of the request REQ2 not being received and/or the first communication terminal 1 being unable to establish a communication session), a failure to establish the third communication session between the communication management device PGC3 and the first communication terminal 1 is noted. The noting of the failure to establish the second communication session triggers the reiteration of step 1008 requesting to establish a third communication session.

Triggering the reiteration of sending the request to establish a third communication session may be delayed (in the event of failure to establish the second communication session between the communication management device PGC3 and the second communication terminal 2). For example, each iteration is spaced apart from the previous one and next one by a preset period. Said period may be configurable. Typically this period equals 30 seconds. Thus, repeating the request to establish the second communication session, implemented for example in the form of an attempt to call back the second communication terminal 2, is reiterated every 30 seconds until the second session is established. In addition, at least one maximum limit may be set, as a number of iterations and/or a time, before the communication management process is terminated in the event of repeated failure.

Optionally, after the failure to establish the third communication session, in the case where the communication management device is an interactive voice server, the communication management device PGC3 sends a voice message to the second communication terminal 2 before interrupting the second communication session. For example, the voice message indicates to the user of the second communication terminal 2 that the first communication terminal 1 is unreachable.

During a step 1009, which is after the establishment of the third communication session between the communication management device 3 and the first communication terminal 1, the communication management device PGC places the first terminal 1 and second terminal 2 in communication with each other by reestablishing the first communication session using the established second communication session and third communication session. Optionally, the implementation of said communication, in other words the establishment of the new first communication session, also called the reestablishment of the first communication session, is achieved by joining the third communication session (between the communication device 3 and the first communication terminal 1) and the second communication session (between the communication management device 3 and the second communication terminal 2). Thus, the initially interrupted first communication session between the first communication terminal TC1 and the second communication terminal TC2 is then reestablished.

Alternatively, a device that is part of the network, and distinct from the first terminal 1, second terminal 2, and from the platform 3, controls placing the first terminal 1 and second terminal 2 in communication with each other, in other words the establishing of the first communication session.

A warning method implemented by a warning device of a first communication terminal 1 will now be described with reference to FIG. 3. The references TC1, TC2, and PGC3 describe elements respectively similar to those of FIG. 1.

Typically, the context of implementing the warning method is as follows: a first communication session is established between a first communication terminal 1 and a second communication terminal 2. For some reason, the first communication session is interrupted: communication is inadvertently cut off for at least one of the users. As explained above, at least one among the first communication terminal 1 and second communication terminal 2 is associated with a respective call identifier IA1, IA2, which corresponds to the MSISDN call identifier.

In particular, during a step 1010, the first communication terminal 1 detects an interruption of the first communication session between the first communication terminal 1 and the second communication terminal 2, for example due to a loss of network for the second communication terminal 2. Optionally, this first communication session may be a video communication.

During a step 1011, the first communication terminal 1 sends interruption information about the first communication session between the first communication terminal 1 and the second communication terminal 2, to a communication management device PGC3. In particular, the interruption information is included in a message sent by the first communication terminal. Said communication interruption information is sent, for example, by means of a data exchange network. Optionally, this network applies a client-server communication protocol, for example a client-server communication protocol developed for the Internet such as the hypertext transfer protocol, better known by the abbreviation "HTTP".

Figure 3:
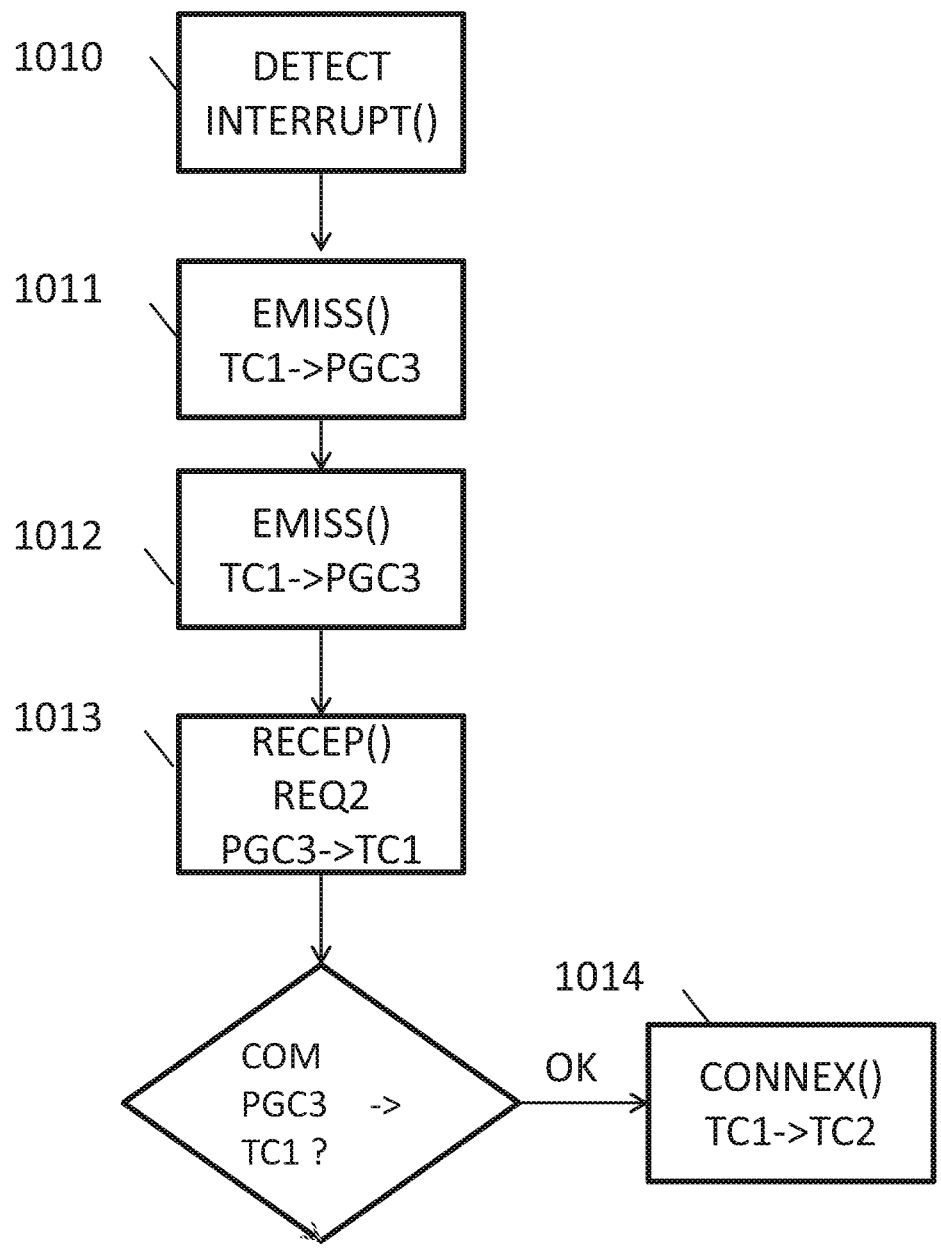
FIG. 3 illustrates a method for establishing a communication from a first communication terminal to a second communication terminal, implemented by the first communication terminal according to the invention.

In particular, the first communication terminal 1 sends to the communication management device PGC3 a first identifier associated with the first communication terminal 1 and a second identifier associated with the second communication terminal 2, in particular with and/or in the interruption information of step 1011 or during a step 1012 illustrated in FIG. 3. The first identifier and second identifier are sent, for example, by means of a data exchange network, such as by applying an "HTTP" protocol.

The data sent concerning the interruption of the first communication session include interruption information and/or a first identifier and/or a second identifier of step 1011 and/or of step 1012. Optionally, said data are sent jointly, in particular in a single message, a single command to reestablish the first communication session, or a single request to reestablish the first communication session. Alternatively, steps 1011 and 1012 are carried out consecutively. For example, step 1011 is carried out prior to step 1012 or vice versa.

In particular, when the communication management device is not implemented in the first communication terminal, during a step 1013 the first communication terminal 1 receives a communication request REQ2 to establish a third communication session, from the communication management device PGC3. For example, the first communication terminal 1 receives a telephone call, which corresponds to an embodiment of the request REQ2 to establish the third communication session, coming from the communication management device PGC3. The request REQ2 to establish a third communication session corresponds, for example, to the request REQ2 to establish a third communication session of FIG. 2 described above.

In particular, during a step 1014, meaning when the third communication session is established between the communication management device PGC3 and the first communication terminal 1, a new first communication session between the first communication terminal 1 and the second communication terminal 2 is established. In other words, the first communication session between the first communication terminal 1 and the second communication terminal 2 is reestablished.

For better comprehension, up to this point we have considered a communication session between only two terminals. Alternatively, the methods are implemented to reestablish communication sessions involving more than two terminals, or "conference mode". In these cases, the steps relating to the second communication terminal are reproduced for at least a third communication terminal, in a similar manner.

Up to this point the methods have been described as being implemented by devices, respectively the communication management device and warning device; they may also be implemented by a processor, or in general by a computing device such as a smartphone. Of course, the methods may also be viewed as implemented by a computer program.

The invention is not limited to the examples of the method and computer program described above solely by way of example, but encompasses all variants conceivable to a person skilled in the art within the framework of the protection sought.

The invention claimed is:

1. A method implemented by a first device of a first communication terminal, the method comprising:

upon a termination of a first communication session between the first communication terminal and a second communication terminal due to an interruption of the first communication session not triggered by said first terminal, sending, during said interruption of said first communication session, interruption information about the first communication session between the first communication terminal and the second communication terminal to indicate that the first communication session was terminated due to the interruption, to a communication management device, the sent interruption information about the first communication session also comprising a command to reestablish the first communication session between the first communication terminal and the second communication terminal.

2. The method according to claim 1, wherein the sent interruption information about the first communication session comprises a first identifier associated with the first communication terminal and a second identifier associated with the second communication terminal.

3. The method according to claim 1, comprising a detection of the interruption of the first communication session between the first communication terminal and the second communication terminal.

4. A first communication terminal, comprising:
a first device comprising:
  a processor; and
  a non-transitory computer-readable medium comprising instructions stored thereon which when executed by the processor configure the first device to:
    upon a termination of a first communication session between the first communication terminal and a second communication terminal due to an interruption of the first communication session not triggered by said first terminal, send, during said interruption of said first communication session, interruption information about the first communication session between the first communication terminal and the second communication terminal to indicate that the first communication session was terminated due to the interruption, to a communication management device, the sent interruption information about the first communication session also comprising a command to reestablish the first communication session between the first communication terminal and the second communication terminal.

5. A communication management method implemented by a communication management device, the communication management method comprising:
  upon reception by the communication management device of interruption information about a first communication session between a first communication terminal and a second communication terminal during an interruption not triggered by said first communication terminal, the received interruption information indicating that the first communication session was terminated due to the interruption, the received interruption information about the first communication session also comprising a command to reestablish the first communication session between the first communication terminal and the second communication terminal; and
  sending to the second communication terminal a request to establish a second communication session, triggered by the received interruption information about the first communication session.

6. The communication management method according to claim 5, comprising, in the event of failure to establish the second communication session between the communication management device and the second communication terminal, reiterating the sending to the second communication terminal of a request to establish the second communication session.

7. The communication management method according to claim 5, comprising, upon establishing the second communication session between the communication management device and the second communication terminal, sending a request to establish a third communication session with the first communication terminal, which triggers, upon establishing the third communication session between the communication management device and the first communication terminal, establishing a new first communication session between the first communication terminal and the second communication terminal by joining the second communication session and third communication session that have been established.

8. The communication management method according to claim 7, comprising, after establishing the third communication session between the communication management device and the first communication terminal, establishing a new first communication session between the first communication terminal and the second communication terminal by joining the second communication session and third communication session that have been established.

9. The communication management method according to claim 5, wherein the reception by the communication management device of interruption information about the first communication session between the first communication terminal and the second communication terminal is achieved via a data exchange network.

10. The communication management method according to claim 5, wherein the first communication sessions between the first communication terminal and the second communication terminal are video communications.

11. A communication management device comprising:
  a processor; and
  a non-transitory computer-readable medium comprising instructions stored thereon which when executed by the processor configure the communication management device to:
  receive interruption information about a first communication session between a first communication terminal and a second communication terminal during an interruption not triggered by said first communication terminal, the received interruption information indicating that the first communication session was terminated due to the interruption, the received interruption information about the first communication session also comprising a command to reestablish the first communication session between the first communication terminal and the second communication terminal; and
  send to the second communication terminal a request to establish a second communication session, triggered by the received interruption information.

12. A non-transitory computer-readable storage medium on which is stored a program for implementing instructions, when this program is executed by a processor of a rust device of a first communication terminal, wherein the instructions configure the first device to:
  upon a termination of a first communication session between the first communication terminal and a second communication terminal due to an interruption of the communication session not triggered by said first terminal, send, during said interruption of said first communication session, interruption information about the first communication session between the first communication terminal and the second communication terminal to indicate that the first communication session was terminated due to the interruption, to a communication management device, the sent interruption information about the first communication session also comprising a command to reestablish the first communication session between the first communication terminal and the second communication terminal.

13. A non-transitory computer-readable storage medium on which is stored a program for implementing a communication management method, when this program is executed by a processor of a communication management device, wherein the instructions configure the communication management device to:

upon reception of interruption information about a first communication session between a first communication terminal and a second communication terminal during an interruption not triggered by said first communication terminal, the received interruption information indicating that the first communication session was terminated due to the interruption, the received interruption information about the first communication session also comprising a command to reestablish the first communication session between the first communication terminal and the second communication terminal; and send to the second communication terminal a request to establish a second communication session, triggered by the received interruption information about the first communication session.

14. The method according to claim 1, wherein said sending of said interruption information is achieved via a data exchange network.

15. The first communication terminal according to claim 4, wherein the instructions stored on the non-transitory computer-readable medium further configure the first device to include a first identifier associated with the first communication terminal and a second identifier associated with the second communication terminal.

16. The first communication terminal according to claim 4, wherein the instructions stored on the non-transitory computer-readable medium further configure the first device to detect the interruption of the first communication session between the first communication terminal and the second communication terminal.

17. The first communication terminal according to claim 4, wherein the instructions stored on the non-transitory computer-readable medium further configure the first device to send the interruption information via a data exchange network.

18. The communication management device according to claim 11, wherein the instructions stored on the non-transitory computer-readable medium configure the communication management device to, in the event of failure to establish the second communication session with the second communication terminal, reiterate the sending to the second communication terminal of a request to establish the second communication session.

19. The communication management device according to claim 11, wherein the instructions stored on the non-transitory computer-readable medium configure the communication management device to, upon establishing the second communication session between the communication management device and the second communication terminal, send a request to establish a third communication session with the first communication terminal, which triggers, upon establishing the third communication session between the communication management device and the first communication terminal, establishing a new first communication session between the first communication terminal and the second communication terminal by joining the second communication session and third communication session that have been established.

20. The communication management device according to claim 19, wherein the instructions stored on the non-transitory computer-readable medium configure the communication management device to, after establishing the third communication session between the communication management device and the first communication terminal, establish a new first communication session between the first communication terminal and the second communication terminal by joining the second communication session and third communication session that have been established.

* * * * *